US010389905B2

United States Patent
Shibahara

(10) Patent No.: US 10,389,905 B2
(45) Date of Patent: Aug. 20, 2019

(54) DOCUMENT READING APPARATUS THAT READS DOCUMENTS PLACED ON A CONTACT GLASS AND HAS A DOCUMENT SIZE DETERMINING FUNCTION

(71) Applicant: KYOCERA Document Solutions Inc., Osaka (JP)

(72) Inventor: Masami Shibahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/933,185

(22) Filed: Mar. 22, 2018

(65) Prior Publication Data
US 2018/0278789 A1 Sep. 27, 2018

(30) Foreign Application Priority Data

Mar. 22, 2017 (JP) .................................. 2017-055659

(51) Int. Cl.
*H04N 1/10* (2006.01)
*H04N 1/00* (2006.01)

(52) U.S. Cl.
CPC ....... *H04N 1/1061* (2013.01); *H04N 1/00708* (2013.01); *H04N 1/00737* (2013.01); *H04N 1/00761* (2013.01); *H04N 1/00779* (2013.01); *H04N 1/00816* (2013.01)

(58) Field of Classification Search
CPC .................................................. H04N 1/1061
USPC ...................................................... 358/1.15
See application file for complete search history.

(56) References Cited

U.S. PATENT DOCUMENTS

| | | | | |
|---|---|---|---|---|
| 9,013,759 B2* | 4/2015 | Ishida | ................ | H04N 1/00689 351/206 |
| 2004/0165223 A1* | 8/2004 | Ishido | ................ | H04N 1/00551 358/449 |
| 2009/0244610 A1* | 10/2009 | Mizutani | ................ | G06K 15/02 358/1.15 |
| 2011/0145759 A1* | 6/2011 | Leffert | ................ | G06F 3/04845 715/800 |
| 2013/0033717 A1* | 2/2013 | Matsumoto | ........... | G06F 3/0483 358/1.13 |

FOREIGN PATENT DOCUMENTS

JP 2007-158965 A 6/2007

* cited by examiner

*Primary Examiner* — Jacky X Zheng
(74) *Attorney, Agent, or Firm* — Hawaii Patent Services; Nathaniel K. Fedde; Kenton N. Fedde

(57) ABSTRACT

Provided is a document reading apparatus that is able to determine a document size even when there is a large number of target document sizes to be determined. The diagonal-line-identifying unit identifies a diagonal line for determining size in image data that is read by the scanner. The document-size-determining unit determines document size in either a first determining operation or a second determining operation. The first determining operation is based on determining data that is read by arranging the scanner at a large-size determining position after a second opening/closing detecting sensor detects a closed state after detecting an open state. The second determining operation is based on change in the diagonal line for determining size in determining data that is read while the scanner scans from the large-size determining position after a first opening/closing detecting sensor detects a closed state.

10 Claims, 12 Drawing Sheets

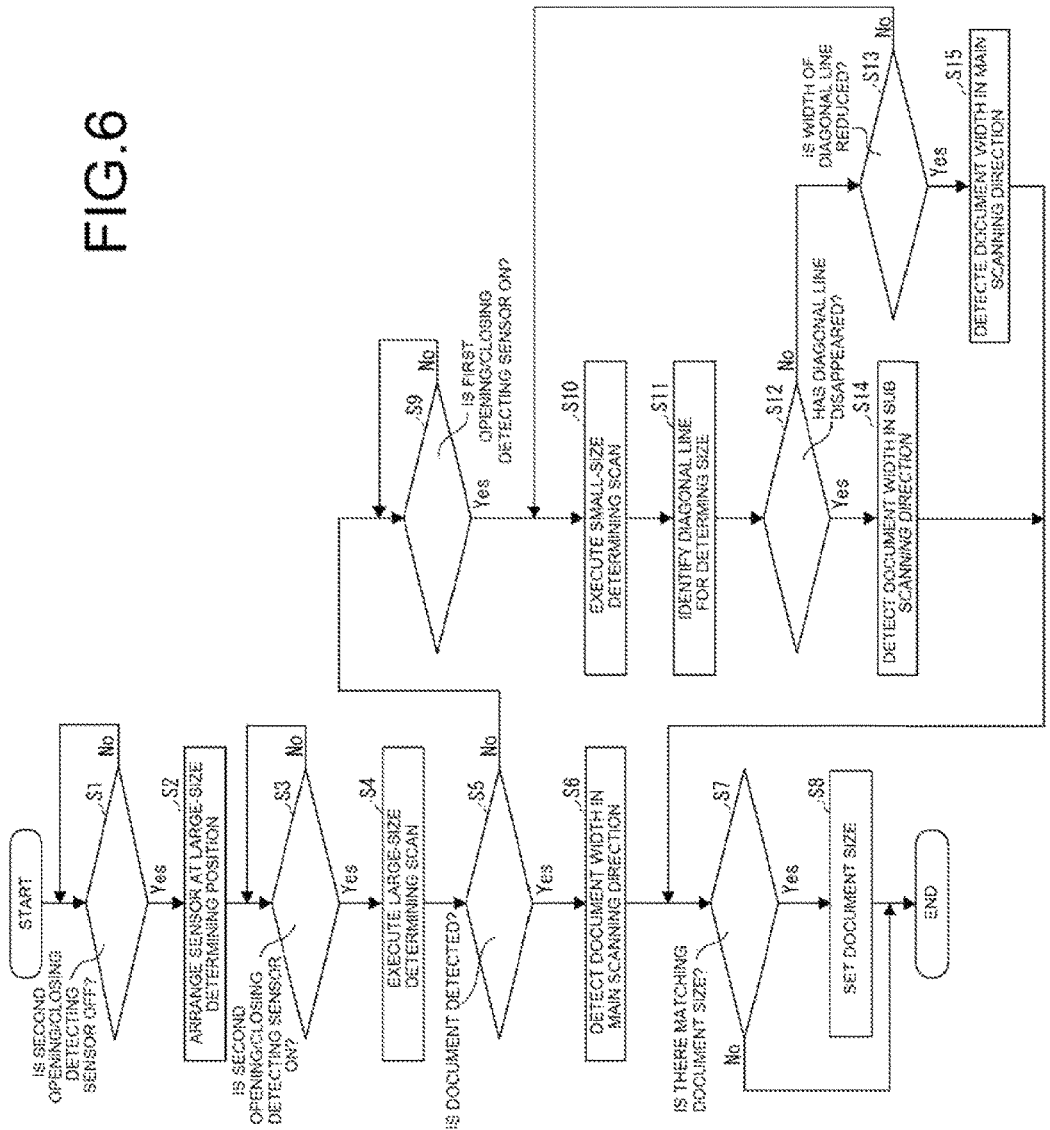

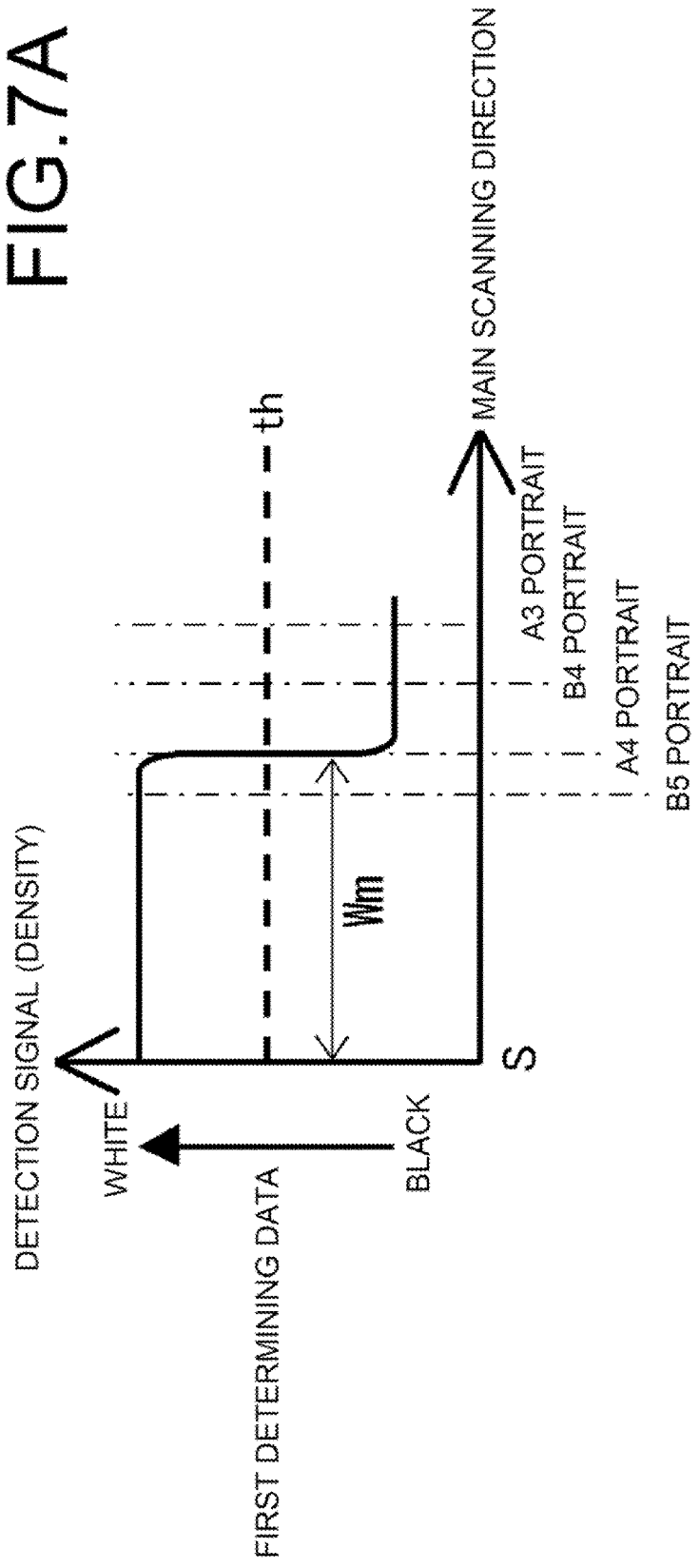

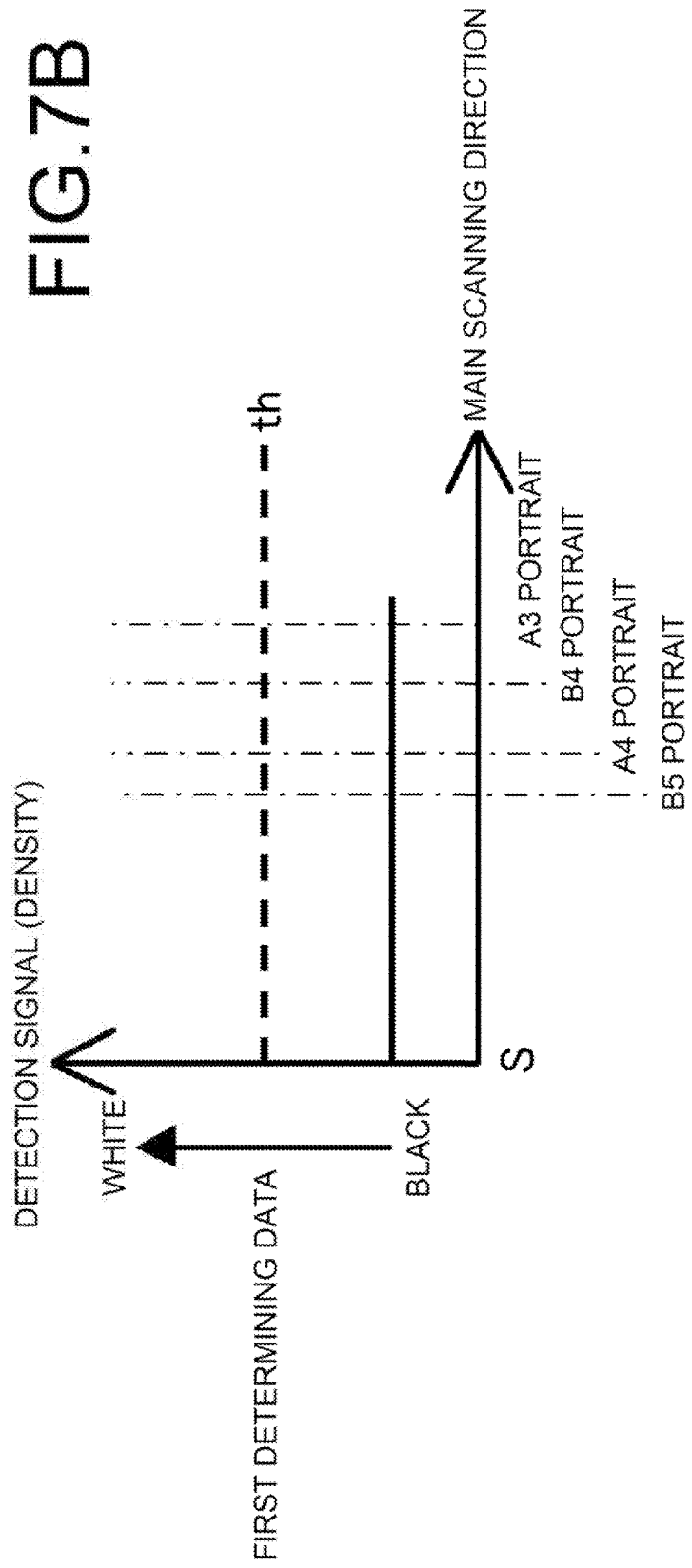

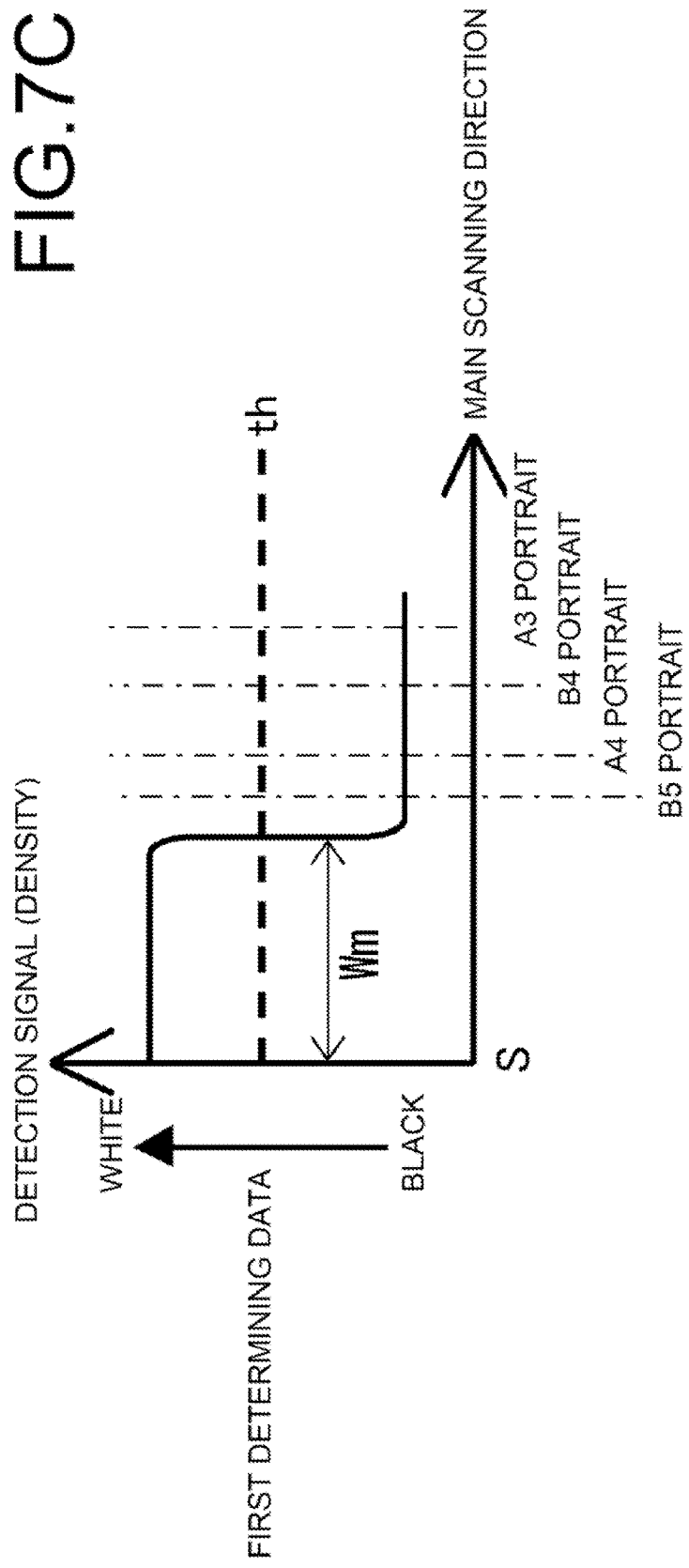

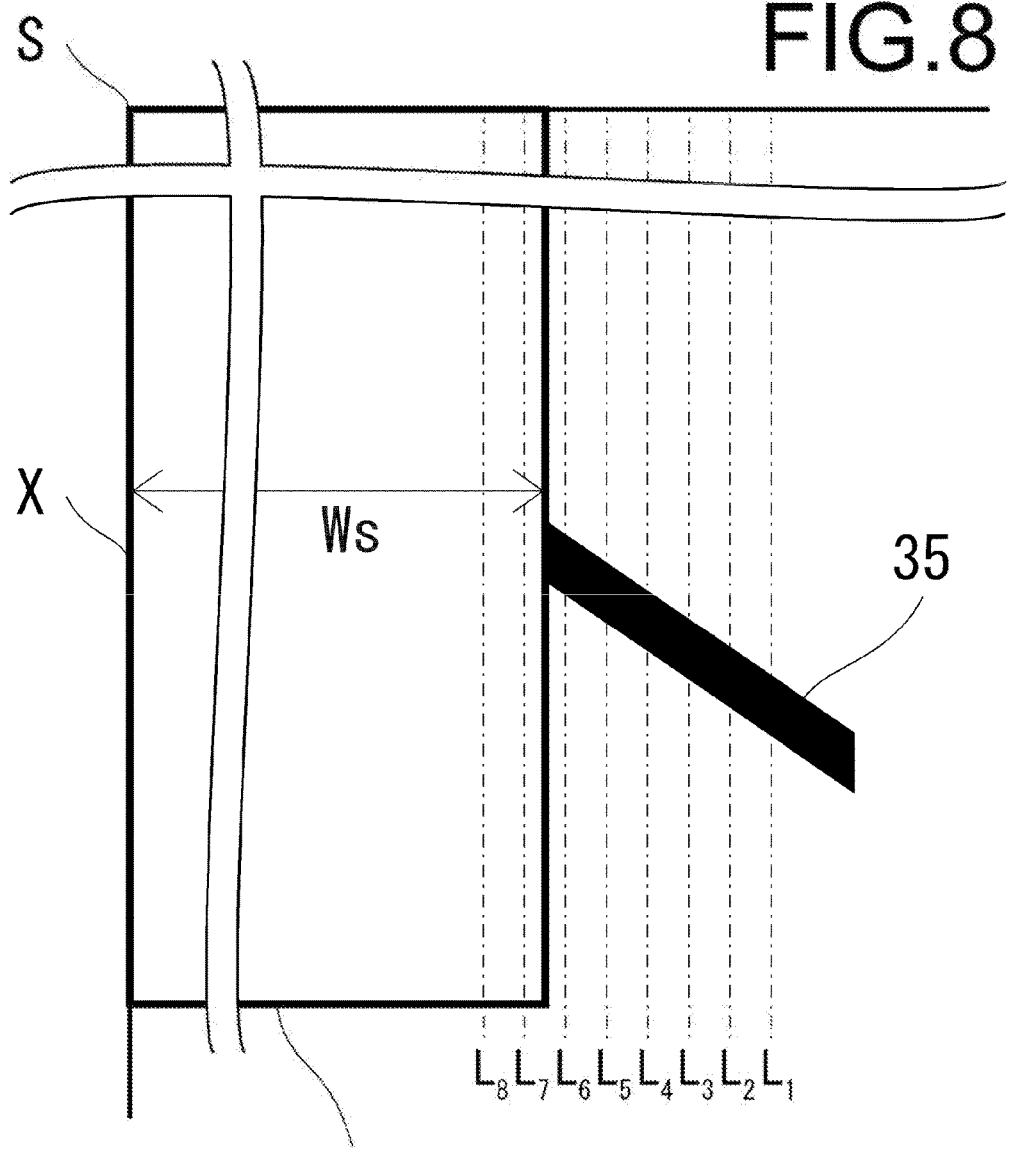

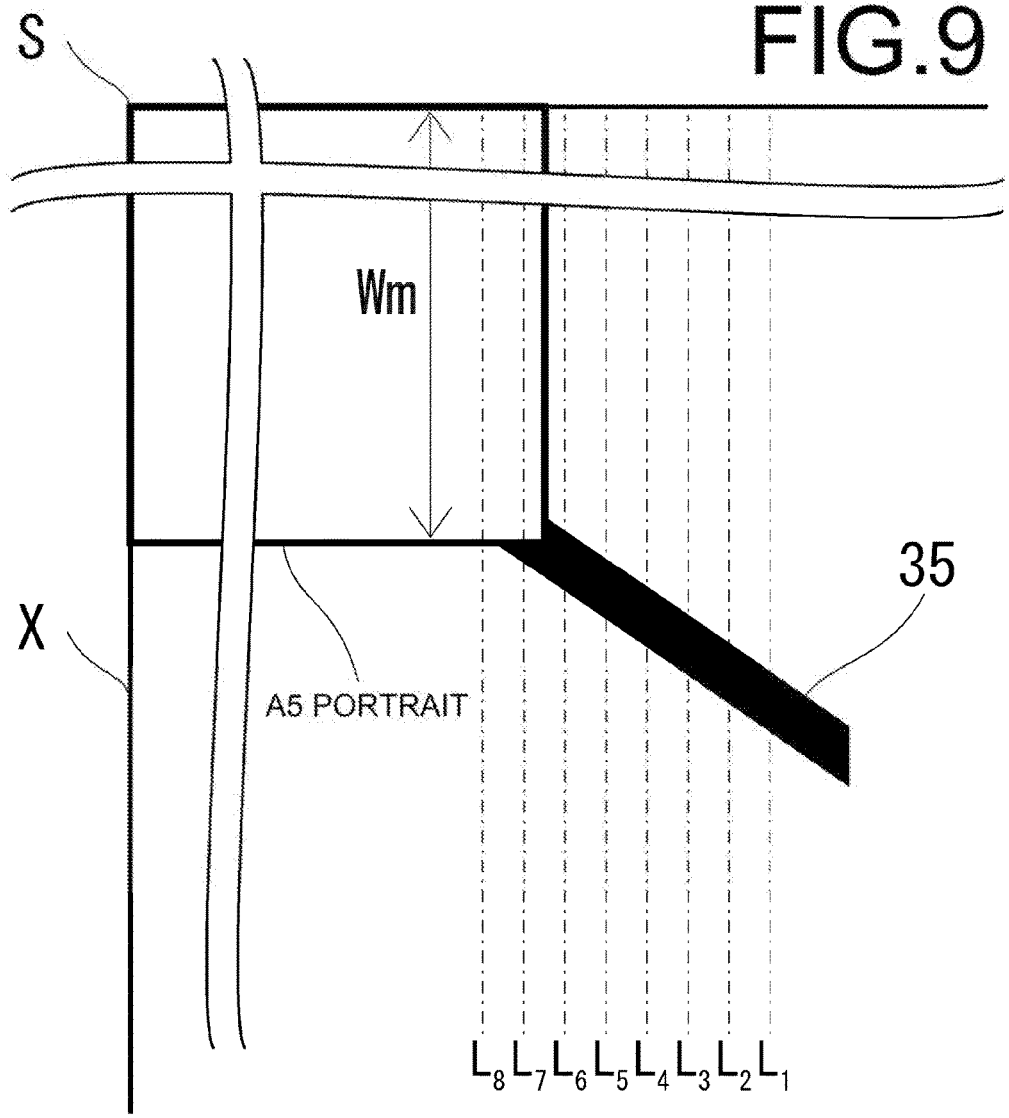

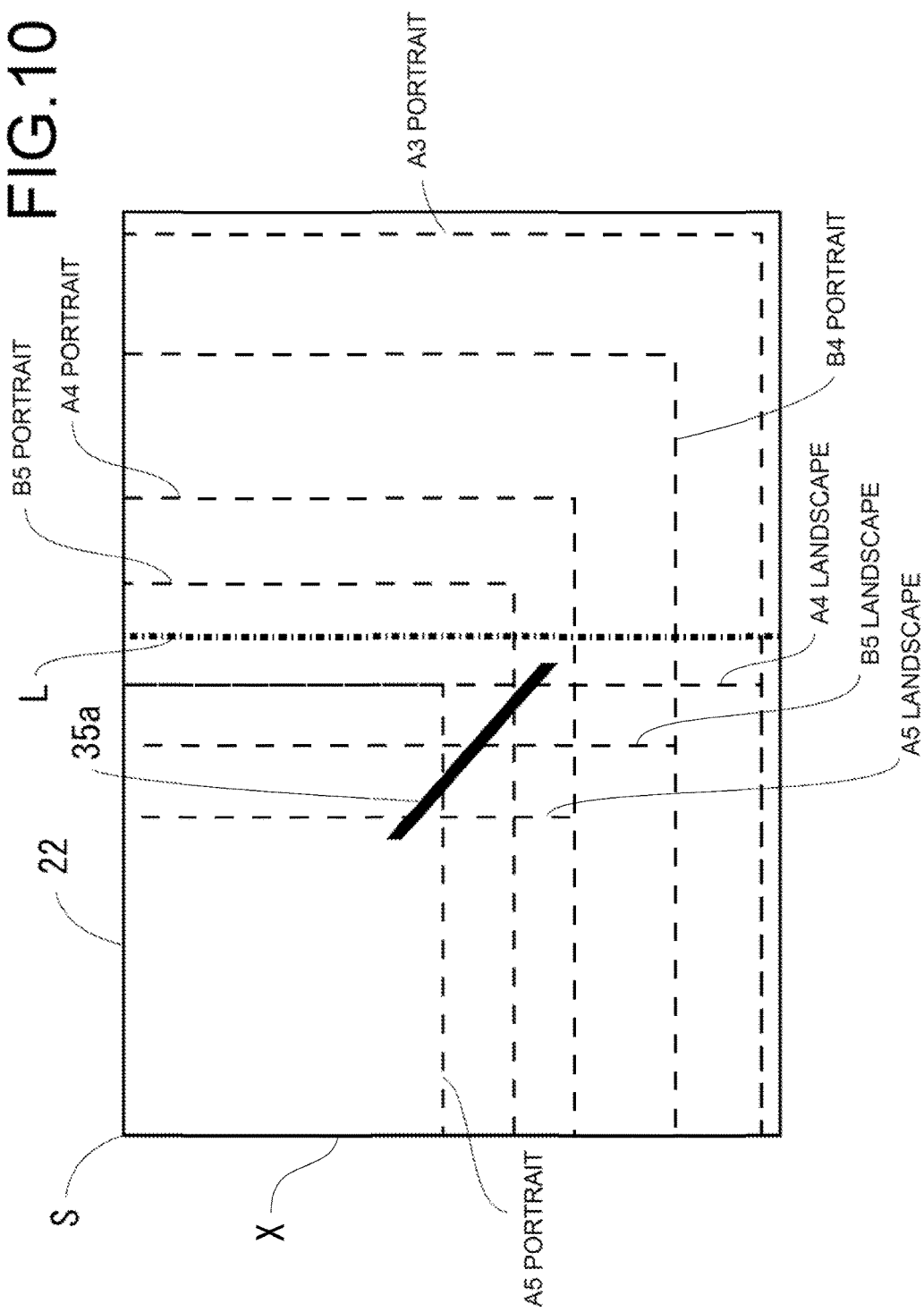

DOCUMENT READING APPARATUS THAT READS DOCUMENTS PLACED ON A CONTACT GLASS AND HAS A DOCUMENT SIZE DETERMINING FUNCTION

INCORPORATION BY REFERENCE

This application is based on and claims the benefit of priority from Japanese Patent Application No. 2017-055659 filed on Mar. 22, 2017, the contents of which are hereby incorporated by reference.

BACKGROUND

The present disclosure relates to a document reading apparatus that reads documents that are placed on a contact glass, and particularly relates to a document reading apparatus having a document size determining function.

Conventionally, an electronic copying machine, facsimile and the like are known as image forming apparatuses that are provided with a document reading apparatus that reads a document such as a photograph, text and the like on a contact glass. Of this kind of image forming apparatus, an image forming apparatus is know that first determines the document size of a document that is placed on the contact glass, then based on the determined document size, performs control of reading, selection of paper to be printed on and the like.

Typical technology of a method for determining document size will be explained. Only a specified position where the document is placed on the contact glass is read, and then using the image data of the read document, a black-and-white determining process is performed for a plurality of patches that correspond to the specified position of the document, and the document size is determined based on the results of the black-and-white determining process for each patch.

SUMMARY

The document reading apparatus according to the present disclosure is a document reading apparatus for scanning a document that is placed on a contact glass based on a reference vertex and reading image data while causing a scanner in which a plurality of photoelectric conversion elements are arranged in a main scanning direction to move in a sub scanning direction. The document reading apparatus includes a document platen cover, a first opening/closing detecting unit, a second opening/closing detecting unit, a document-size-determining unit and a diagonal-line-identifying unit. The document platen cover is a cover on which a diagonal line for determining size having a fixed width is provided on a document-pressing surface that faces the contact glass, and that opens and closes a document placement surface of the contact glass. The first opening/closing detecting unit detects the opening or closing of the document platen cover. The second opening/closing detecting unit detects whether or not the document platen cover is opened more than a preset threshold angle as an opened state or closed state at the threshold angle. The document-size-determining unit determines a document size of a document that is placed on the contact glass from among multiple target document sizes to be determined by using determining data that is read by the scanner. The diagonal-line-identifying unit identifies the diagonal line for determining size in image data that is read by the scanner. The document-size-determining unit, when the second opening/closing detecting unit detects a closed state after detecting an opened state, executes a first determining operation for determining a document size based on the determining data that is read by arranging the scanner at a size-determining position where it is possible to determine a document size by only the document width in the main scanning direction. Together with this, when a document size can not be determined by the first determining operation, the document-size-determining unit, after the first opening/closing detecting unit detects a closed state, executes a second determining operation that causes the diagonal-line-identifying unit to identify the diagonal line for determining size in the determining data that is read while the scanner scans from the size-determining position, and determines a document size based on the change in the diagonal line for determining size.

BRIEF DESCRIPTION OF THE DRAWINGS

FIG. 6 is a flowchart for explaining the document size determining operation in an embodiment of a document reading apparatus according to the present disclosure.

FIG. 7A is a diagram illustrating an example of first determining data that is acquired by a large-size-determining scan by the document-reading unit 2 illustrated in FIG. 5.

FIG. 7B is a diagram illustrating an example of first determining data that is acquired by a large-size-determining scan by the document-reading unit 2 illustrated in FIG. 5.

FIG. 7C is a diagram illustrating an example of first determining data that is acquired by a large-size-determining scan by the document-reading unit 2 illustrated in FIG. 5.

FIG. 8 is an explanatory diagram for explaining the determining operation by the document-size-determining unit illustrated in FIG. 5 based on second determining data.

FIG. 9 is an explanatory diagram for explaining the determining operation by the document-size-determining unit illustrated in FIG. 5 based on second determining data.

FIG. 10 is a diagram illustrating an example of a variation of the diagonal line for determining size illustrated in FIG. 4.

DETAILED DESCRIPTION

Next, an embodiment according to the present disclosure will be explained in detail with reference to the drawings.

Figure 1:
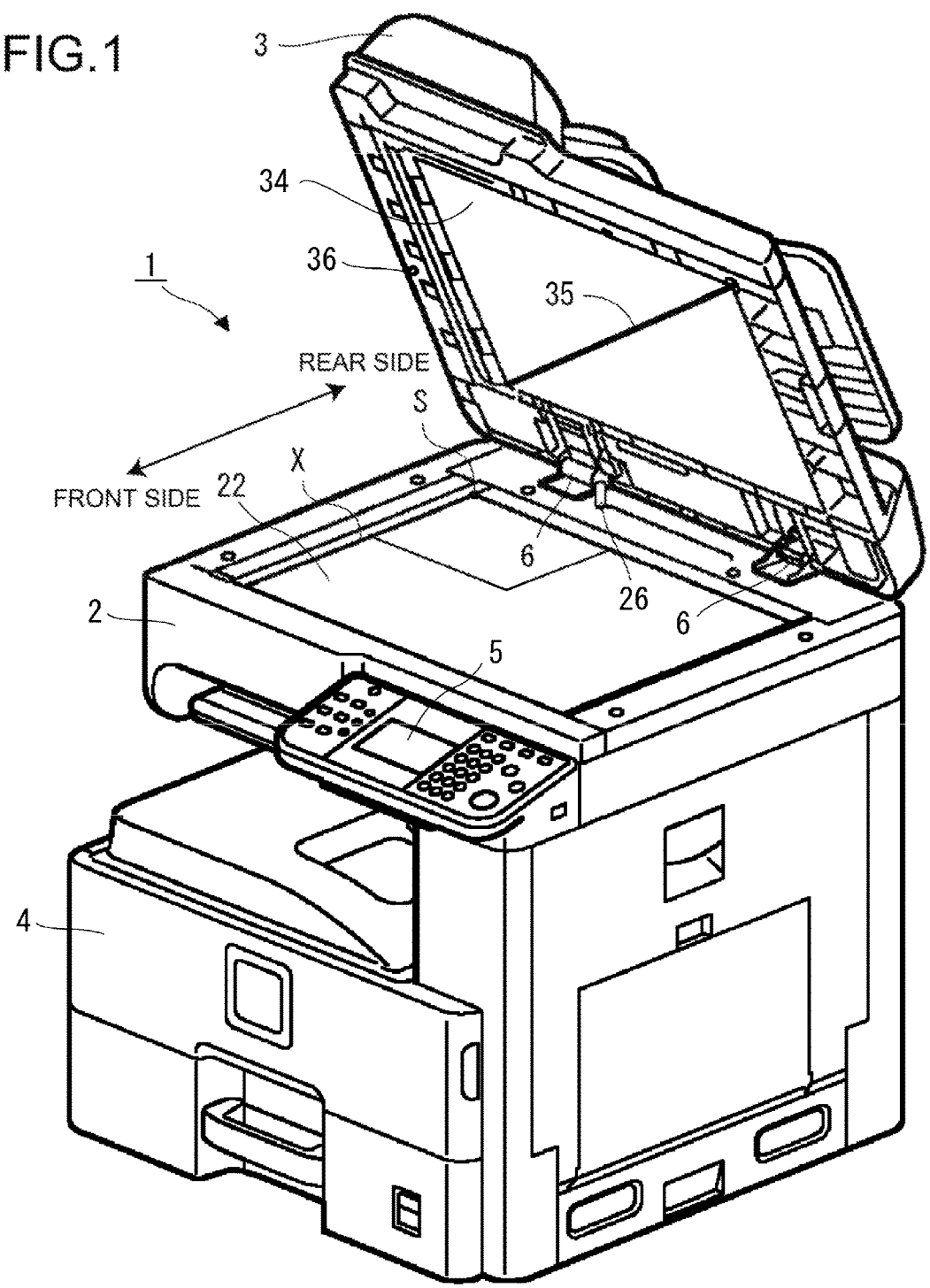
FIG. 1 is an exterior perspective view illustrating the configuration of an embodiment of a document reading apparatus according to the present disclosure.
Figure 2:
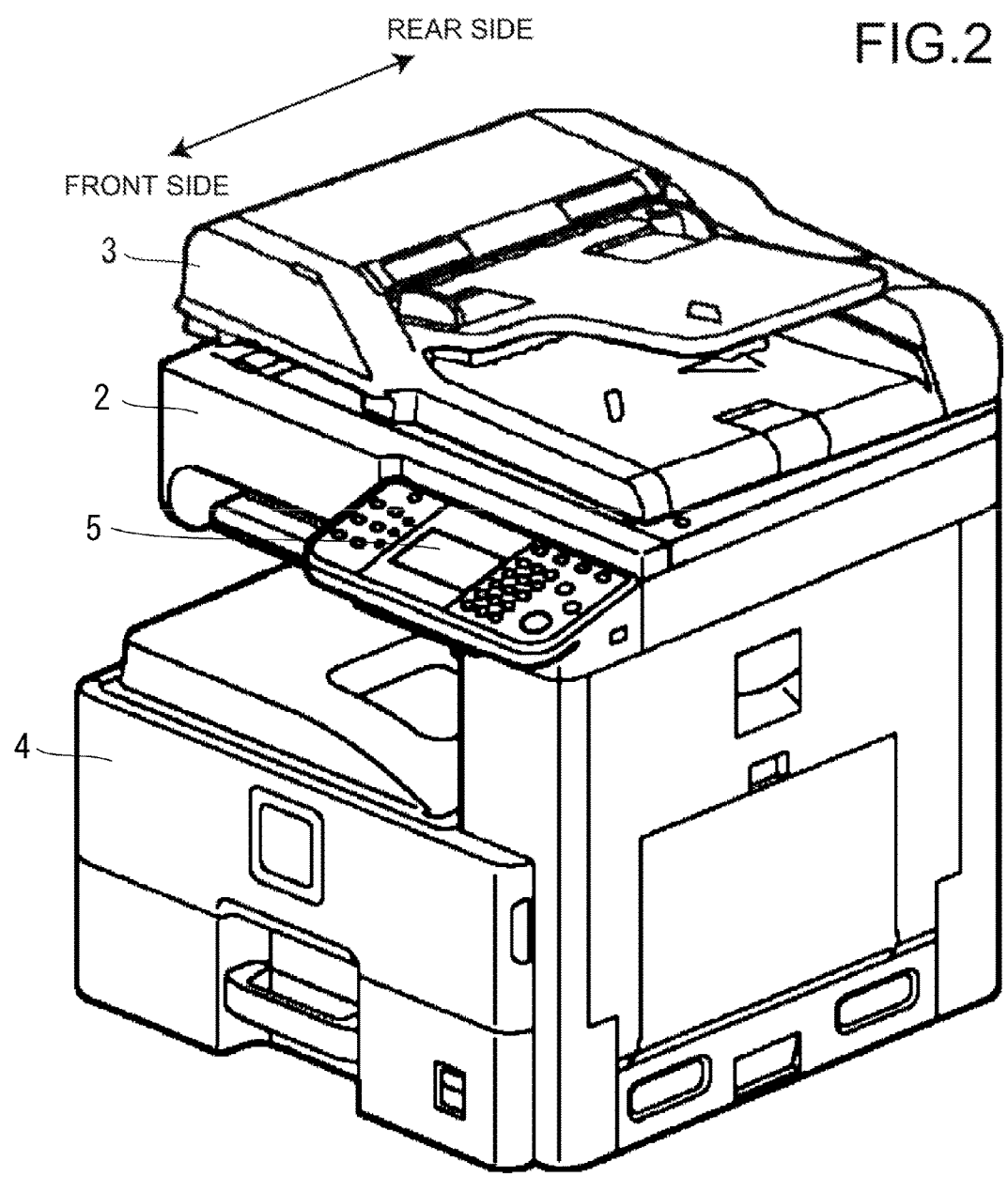
FIG. 2 is an exterior perspective view illustrating the configuration of an embodiment of a document reading apparatus according to the present disclosure.

The document reading apparatus of this embodiment is a copying machine 1, and referencing FIG. 1 and FIG. 2, includes a document-reading unit 2, a document-feeding unit 3, a main unit 4, and an operation unit 5. The document-reading unit 2 is arranged on the top part of the main unit 4, and the document-feeding unit 3 is arranged on the top part of the document-reading unit 2. The operation unit 5 is arranged on the front side of the copying machine 1.

Moreover, the document-feeding unit 3 and the document-reading unit 2 are connected by a hinge mechanism 6 on the rear side of the copying machine 1, and by opening the document-feeding unit 3 upward from the front side, the contact glass 22 on the top surface of the document-reading unit 2 is configured so as to be able to be opened. FIG. 1 illustrates the state in which the document-feeding unit 3 is opened widely, and FIG. 2 illustrates the state in which the document-feeding unit 3 is opened only a small amount. Incidentally, the document reading apparatus of this embodiment is explained as being a copying machine 1; however, needless to say, this also includes a document reading apparatus alone, a multifunction peripheral and the like.

The operation unit 5 for setting the copying machine 1 and performing operation instructions is arranged on the front side of the copying machine 1. The operation unit 5 is provided with a display-input unit such as a liquid-crystal panel and the like, and an input unit such as operation buttons and the like.

Figure 3:
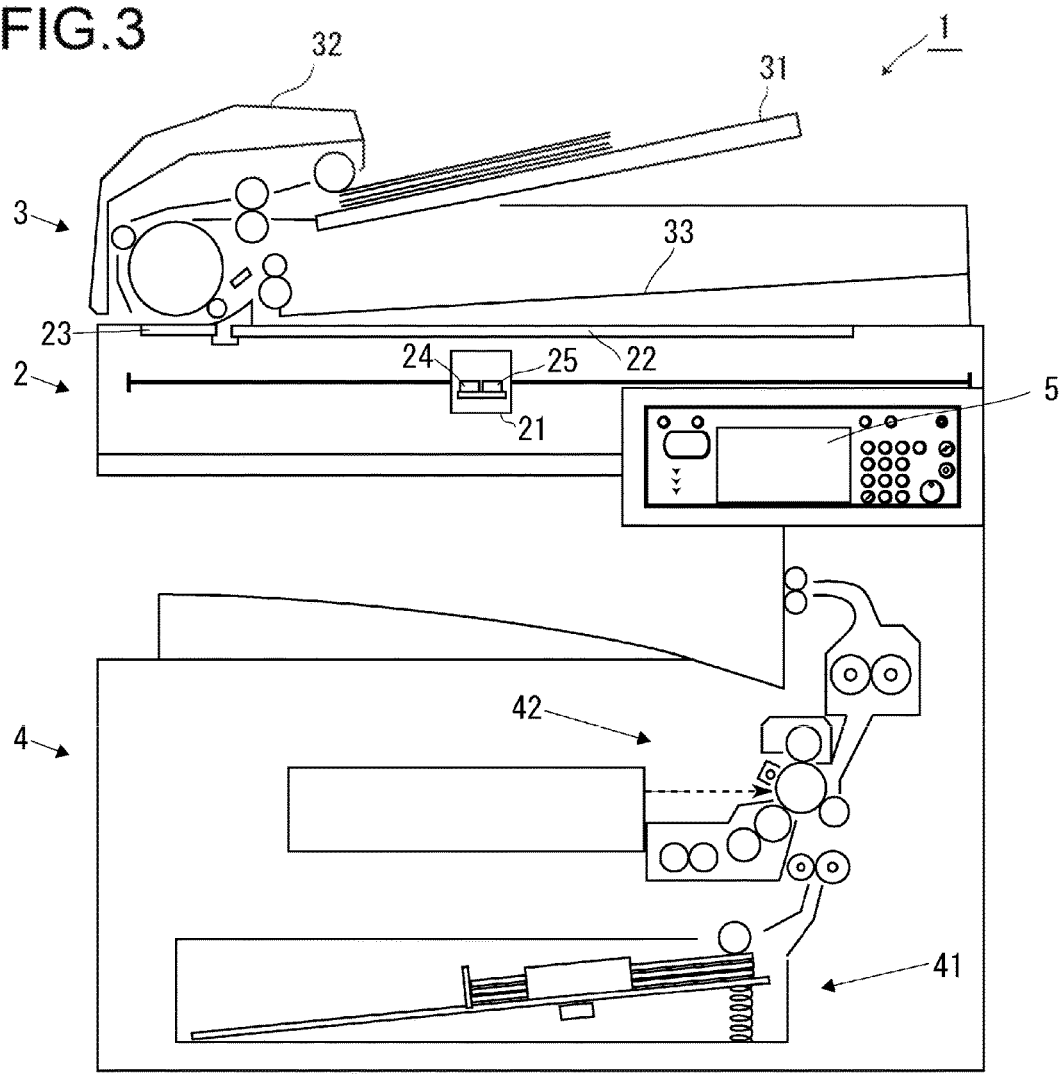
FIG. 3 is a cross-sectional schematic view illustrating the internal configuration of an embodiment of a document reading apparatus according to the present disclosure.

Referring to FIG. 3, the document-reading unit 2 includes a scanner 21, a contact glass 22, and a slit glass 23. The scanner 21 includes a light source 24 and a light-receiving unit 25. The light source 24 uses an LED (Light-Emitting Diode). The light-receiving unit 25 includes a plurality of photoelectric conversion elements arranged in a main scanning direction of a CCD (Charge Coupled Device) line sensor, CMOS (Complementary Metal Oxide Semiconductor) line sensor or the like. The scanner 21 is configured so as to be able to move in a sub scanning direction.

The contact glass 22 is configured using a rectangular shaped transparent material such as glass or the like, and is a document platen that is arranged on the top surface of the document-reading unit 2. As illustrated in FIG. 1, setting a document on the contact glass 22 is based on the left rear vertex of the contact glass 22 (hereafter, referred to as the reference vertex S). Then, the document that is set on the contact glass 22 is read by the scanner 21 from the left edge side of the contact glass 22. (Hereafter, the left side edge of the contact glass 22 will be referred to as the reading starting reference line X.)

The slit glass 23 is configured by a rectangular transparent member such as glass or the like that is formed in a direction that is orthogonal to the conveying direction of the document by the document-feeding unit 3.

The document-feeding unit 3 includes a document-placement unit 31, a document-conveying mechanism 32 and a document-discharge unit 33. A document that is placed on the document-placement unit 31 is picked up in order one sheet at a time and conveyed to a position facing the slit glass 23 by the document-conveying mechanism 32, and after that, is discharged by the document-discharge unit 33.

The document-feeding unit 3 functions as a document platen cover that opens and closes the document-placement surface of the contact glass 22 that is the document platen. By opening the document-feeding unit 3 upward, the top surface of the contact glass 22 is opened to a state in which a document can be set on the contact glass 22. Moreover, the surface of the document-feeding unit 3 that faces the contact glass 22 is a document-pressing surface 34 that is white or the like.

Figure 4:
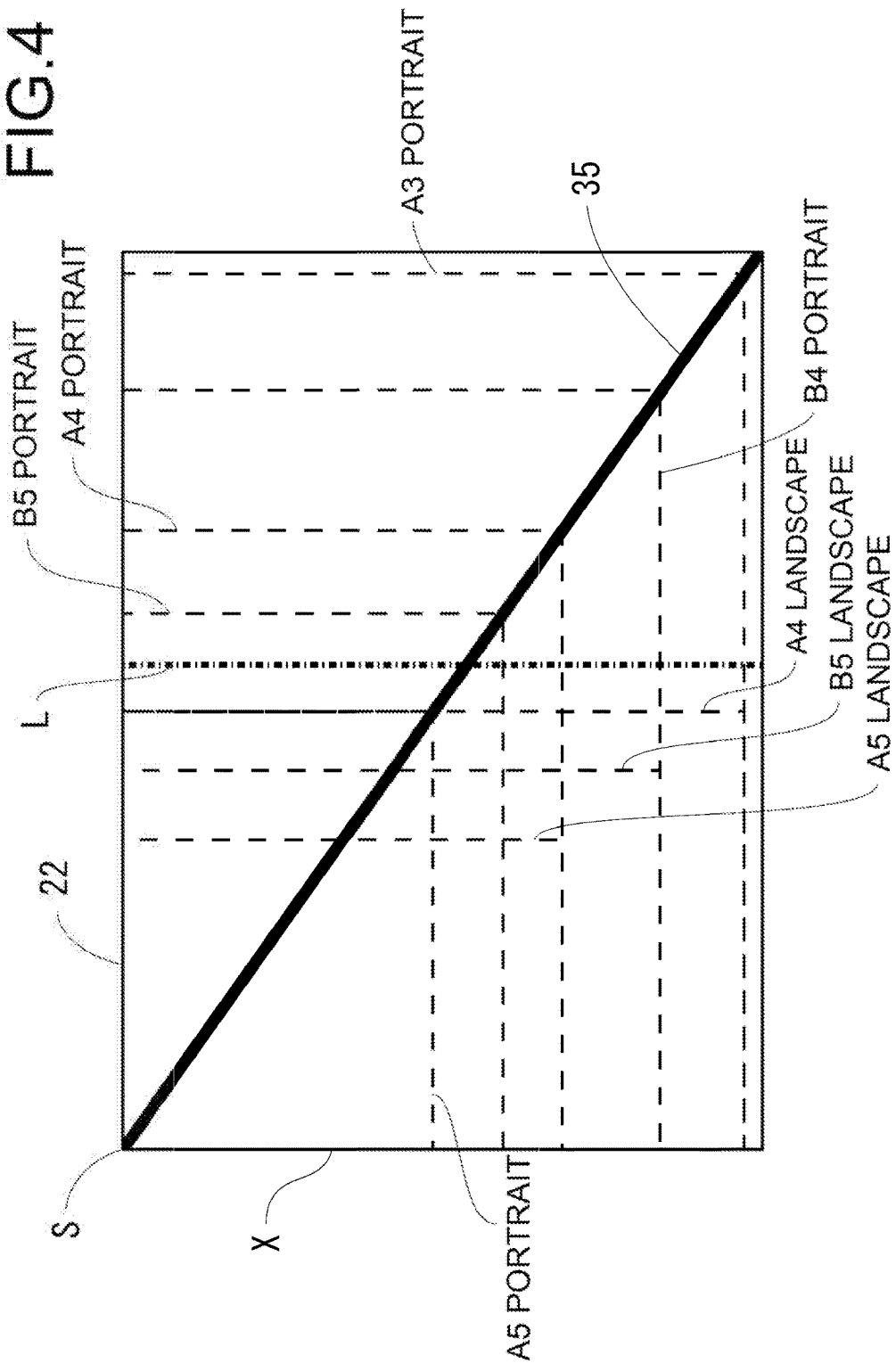
FIG. 4 is diagram illustrating the contact glass illustrated in FIG. 1, and illustrates the arrangement of the set document and diagonal line for determining the document size.

A diagonal line 35 for determining size is provided on the document-pressing surface 34. The diagonal line 35 for determining size has a fixed width (for example, the width of the diagonal line in the main scanning direction: 10 mm), and is a straight line having a color (for example, black) with a density that is higher than the color of the document-pressing surface 34. As illustrated in FIG. 4, the diagonal line 35 for determining size is provided in a position that is aligned with the diagonal line of an A3 sized document (A3 portrait) that is set on the contact glass 22 in the portrait orientation in a state in which the document-feeding unit 3 is closed. In addition, in this embodiment, a document of which the lengthwise direction is oriented in the sub scanning direction is called the portrait orientation, and a document of which the lengthwise direction is oriented in the main scanning direction is called the landscape orientation.

As illustrated in FIG. 4, the contact glass 22 of the present embodiment has a size such that a document up to a size of A3 portrait can be set. In FIG. 4, examples of setting a document having a size of A5 portrait, A5 landscape, B5 portrait, B5 landscape, A4 portrait, A4 landscape, B4 portrait, and A3 portrait on the contact glass 22 are illustrated using dotted lines.

In referencing FIG. 1, a second opening/closing sensor 26 is provided in the document-reading unit 2, and a first opening/closing sensor 36 is provided in the document-feeding unit 3, and each is respectively provided as an opening/closing detecting unit for detecting the opening/closing operation of the document-feeding unit 3. The first opening/closing detecting sensor 36 is a microswitch for detecting the opening and closing of the document-feeding unit 3, and is ON when the document-feeding unit 3 is in a closed state, and is OFF when the document-feeding unit 3 is an opened state. The second opening/closing detecting sensor 26 is a microswitch for detecting whether or not opening/closing is at a preset threshold angle, or in other words detects whether or not the opening of the document-feeding unit 3 is opened to an angle greater than the threshold angle, and is ON when the opening angle of the document-feeding unit 3 is equal to or less than the threshold angle, and is OFF when the opening angle of the document-feeding unit 3 is greater than the threshold angle. In addition, the threshold angle at which the second opening/closing detecting sensor 26 is turned ON/OFF is set as follows. When reading image data is performed by the document-reading unit 2 in a state in which the document-feeding unit 3 is opened at the threshold angle, the light that is irradiated from the light source 24 is set so as not to be formed on the light-receiving unit 25 in a range outside of the document.

When there is an instruction from the operation unit 5 to read a document in a state in which a document is not placed in the document-placement unit 31, or in a state in which the document-feeding unit 3 is opened, a document that is placed on the contact glass 22 is read. When reading a document that is placed on the contact glass 22, the scanner 21 reads and acquires image data while scanning the document that is placed on the contact glass 22 from the reading starting reference line X in the sub scanning direction that is orthogonal to the main scanning direction, and outputs the acquired image data to the main unit 4.

When there is an instruction from the operation unit 5 to read a document in a state in which a document is placed in the document-placement unit 31, the document is conveyed by the document-feeding unit 3 and read. The case of reading a document that is conveyed by the document-feeding unit 3 will be explained. The scanner 21 is moved to a position that faces the slit glass 23, and via the slit glass 23, reads the document and acquires image data in synchronization with the conveying operation of the document by the document-feeding unit 3, and outputs the acquired image data to the main unit 4.

The main unit 4 includes a paper-supply unit 41 and a printing unit 42. The paper-supply unit 41 is a paper-supply cassette in which multiple sheets of paper are stored. The printing unit 42 performs printing by forming a toner image based on printing data, transferring the formed toner image to printing paper that is conveyed from the paper-supply unit 41, and fixing the toner image that is transferred to the printing paper at a specified fixing temperature.

Figure 5:
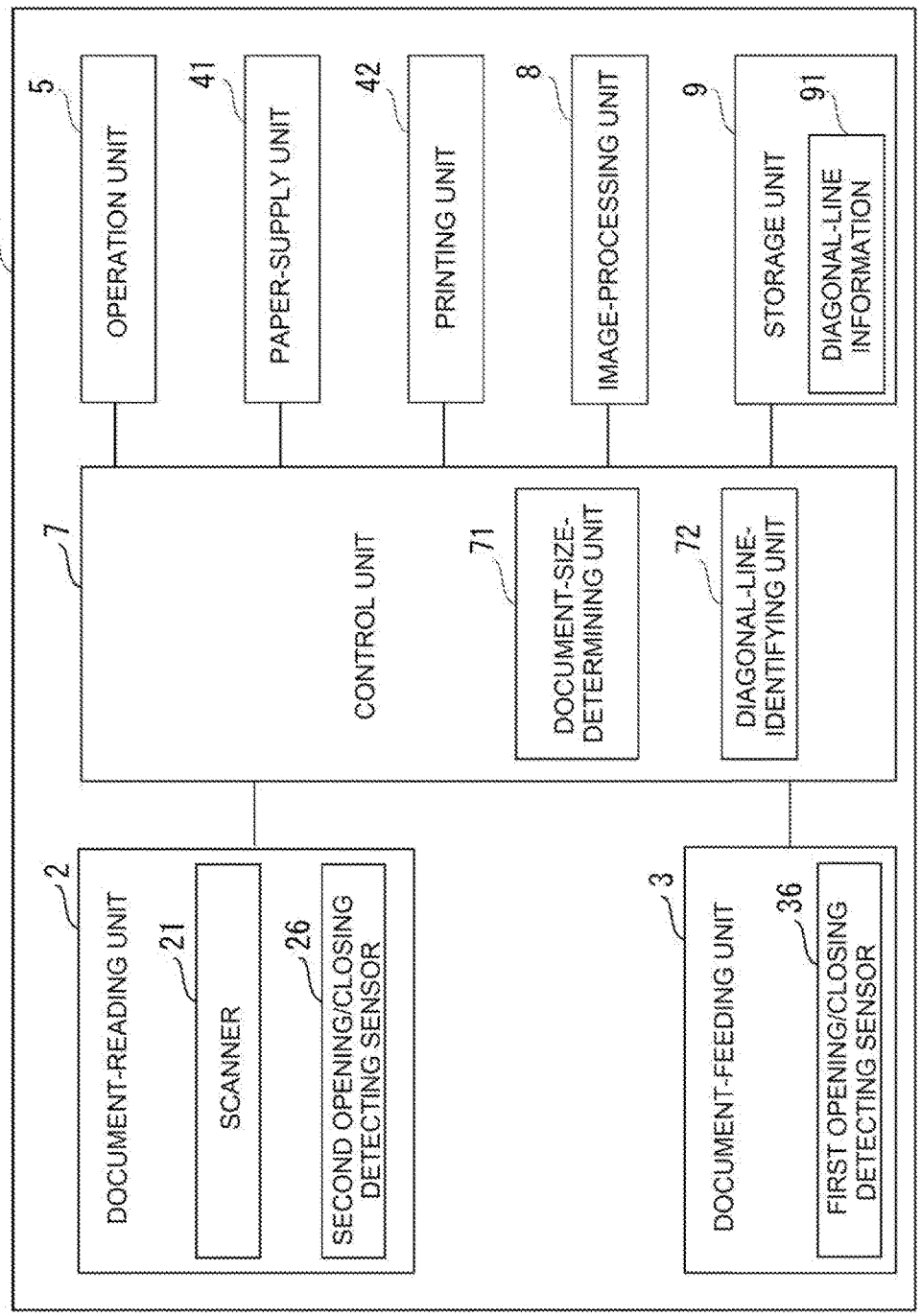
FIG. 5 is a block diagram illustrating an outline of the configuration of an embodiment of a document reading apparatus according to the present disclosure.

FIG. 5 is a block diagram illustrating an outline of the configuration of a copying machine 1. The document-reading unit 2, document-feeding unit 3, paper-supply unit 41, printing unit 42 and operation unit 5 described above are connected to a control unit 7, and operation is controlled by the control unit 7. Moreover, an image-processing unit 8 and storage unit 9 are connected to the control unit 7.

The control unit 7 is an arithmetic processing circuit such as a microcomputer or the like that includes a CPU (Central Processing Unit), ROM (Read Only Memory), RAM (Random Access Memory) and the like. The ROM stores a control program for performing control of the operation of the copying machine 1. The control unit 7, by reading the control program that is stored in the ROM and expanding that control program in the RAM, performs overall control of the apparatus according to various kinds of instruction information that is inputted from the operation unit 5.

Moreover, the control unit 7 functions as a document-size-determining unit 71 that determines the document size of a document that is placed on the contact glass 22 from among multiple target document sizes to be determined. The document-size-determining unit 71, according to the respective ON/OFF status of the second opening/closing detecting sensor 26 and first opening/closing detecting sensor 36, determines the document size by using the image data that is read by the document-reading unit 2 as determining data. In this embodiment, the document-size-determining unit 71 uses the document sizes A5 portrait, A5 landscape, B5 portrait, B5 landscape, A4 portrait, A4 landscape, B4 portrait, A3 portrait indicated by the dotted lines in FIG. 4 as target document sizes to be determined.

Furthermore, the control unit 7 functions as a diagonal-line-identifying unit 72 that identifies the diagonal line 35 for determining size in the image data acquired by the document-reading unit 2. When the diagonal line 35 for determining size is identified in the image data when printing the image data acquired by the document-reading unit 2 by the printing unit 42, the diagonal-line-identifying unit 72 causes the image-processing unit 8 to delete the identified diagonal line 35 for determining size.

The multiple determining data acquired by the document-reading unit 2 includes image data that is acquired by a large-size determining scan, and image data that is acquired by a small-size determining scan.

In the large-size determining scan, the document-reading unit 2 arranges the scanner 21 at a position where it is possible to determine the document size for only the document width in the main scanning direction, and reads one line portion of image data as the determining data. In this embodiment, as illustrated by the one-dot chain line L in FIG. 4, the scanner 21 is arranged at a position that is further from the reference vertex S than the end section of the A4 landscape in the sub scanning direction, and closer to the reference vertex S than the end section of the B5 portrait. In the following, the arrangement of the scanner 21 during large-size determining scanning is called the large-size determining position L.

In small-size determining scanning, the document-reading unit 2 reads image data as determining data while scanning with the scanner 21 from the large-size determining position L toward the reading starting reference line X after large-size determining scanning.

The image-processing unit 8 is an arithmetic processing circuit such as a microcomputer or the like that includes a CPU (Central Processing Unit), ROM (Read Only Memory), RAM (Random Access Memory) and the like. The image-processing unit 8, for example, executes various jobs related to image processing such as enlargement/reduction processing, density adjustment processing, gradation adjustment processing and the like.

The storage unit 9 is a storage unit such as a semiconductor memory, HDD (Hard Disk Drive) or the like, and is used as a memory for image processing, or as a memory for storing various settings. Moreover, the storage unit 9 stores diagonal-line information 91 that indicates the width and arrangement of the diagonal line 35 for determining size.

Next, the document-size determining operation of the copying machine 1 of this embodiment will be explained in detail with reference to FIGS. 6 to 9.

Referring to FIG. 6, in order to detect a series of operations by the operator of opening the document-feeding unit 3 and setting a document on the contact glass 22, the control unit 7 functions as a document-size-determining unit 71. The document-size-determining unit 71 monitors the OFF state of the second opening/closing detection sensor 26, or in other words, monitors whether opening of the document-feeding unit 3 is greater than the threshold angle (step S1).

In step S1, when the second opening/closing detection sensor 26 is OFF, or in other words, when opening of the document-feeding unit 3 is greater than the threshold angle, the document-size-determining unit 71 arranges the scanner 21 at the large-size determining position L (step S2). In addition, the home position of the scanner 21 may be set as the large-size determining position L, or the position facing the slit glass 23 or the like may be set as the home position, and the scanner 21 can be moved to the large-size determining position L.

Next, the document-size-determining unit 71 monitors the ON state of the second opening/closing detection sensor 26, or in other words, monitors whether or not the opening of the document-feeding unit 3 is equal to or less than the threshold angle as a way of detecting the closing of the document-feeding unit 3 after opening is detected at the threshold angle (step S3).

The case in which the ON state of the second opening/closing detection sensor 26 is detected in step S3, or in other words, when the opening of the document-feeding unit 3 is detected as being equal to or less than the threshold angle as a way of detecting the closing of the document-feeding unit 3 after opening is detected at the threshold angle will be explained. The document-size determining unit 71 causes the document-reading unit 2 to execute a large-size determining scan, and acquires image data by the large-size determining scan as first determining data (step S4).

In step S4, the document-reading unit 2 performs a large-size determining scan in a state in which the document-feeding unit 3 is opened at the threshold angle, and first determining data such as illustrated in FIG. 7A to FIG. 7C is acquired. In FIG. 7A to FIG. 7C, the horizontal axis indicates the main scanning direction, and the vertical axis indicates the detection signal (luminance) from the light-receiving unit 25. Incidentally, the detection signal from the light-receiving unit 25 becomes higher as the brightness (white) increases, and becomes lower as the darkness (black) increases. Furthermore, FIG. 7A to FIG. 7C illustrate the first determining data for the case in which the document is solid white.

Next, the document-size-determining unit 71 determines whether or not a document is detected (step S5). As illustrated in FIG. 7A and FIG. 7C, the document-size-determining unit 71 determines that a document is detected when there is an area that exceeds a threshold value th, and as illustrated in FIG. 7B, determines that a document is not detected when there is no area that exceeds the threshold value th.

When a document is detected in step S5, the document-size-determining unit 71 detects the document width Wm in the main scanning direction based on the first determining data (step S6). In the first determining data, areas where there is no document become black, so in the end section on the front side of a document, the detection signal appears as a large difference. Therefore, by setting a suitable threshold value th, the document width Wm in the main scanning direction can be detected based on the first determining data.

Next, the document-size-determining unit 71 determines whether or not the there is a size among the target document sizes to be determined that match the document width Wm in the main scanning direction (step S7).

In step S7, when there is a document size that matches the document width Wm in the main scanning direction, the document-size-determining unit 71 sets the matching document size as the determination result (step S8), and then ends the document-size-determining operation. As illustrated in FIG. 7A, when the document width Wm in the main scanning direction matches the A4 portrait size, the document-size-determining unit 71 sets the A4 portrait size as the determination result. In this determination according to the document width Wm in the main scanning direction that is identified based on the first determining data, it is possible to determine the sizes B5 portrait, A4 portrait, B4 portrait, and A3 portrait.

As illustrated in FIG. 7C, when there is no size that matches the document width Wm in the main scanning direction, it is determined in step S7 that there is no document size that matches the document width Wm in the main scanning direction. In this case, the document that is set on the contact glass 22 has a size that differs from the target document sizes to be determined, so the document-size-determining unit 71 ends the document-size-determining operation without setting the document size.

In step S5, when a document is not detected, the document-size-determining unit 71 monitors the ON state of the first opening/closing detecting sensor 36, or in other words, monitors the closing of the document-feeding unit 3 (step S9).

The case in which the ON state of the first opening/closing detecting sensor 36, or in other words, closing of the document-feeding unit 3 is detected in step S9 will be explained. The document-size-determining unit 71 causes the document-reading unit 2 to execute a small-size determining scan, and acquires one line of image data from the small-size determining scan as second determining data (step S10).

Next, the control unit 7 functions as the diagonal-line identifying unit 72. The diagonal-line-identifying unit 72 identifies the diagonal line 35 for determining size in the second determining data based on the diagonal-line information 91 (step S11).

Next, the document-size-determining unit 71 determines whether or not the diagonal line 35 for determining size in the second determining data has disappeared, or in other words, determines whether or not the diagonal-line-identifying unit 72 is not able to identify the diagonal line 35 for determining size (step S12). Moreover, the diagonal-line-determining unit 72 determines whether or not the width of the identified diagonal line 35 for determining size is reduced (step S13).

In reading lines $L_1$ to $L_6$ indicated by the dot-dash lines in FIG. 8, the diagonal line 35 for determining size in the second determining data is identified by the identified width. In this case, NO is determined in both step S12 and step S13, and the document-size-determining unit 71 returns to step S10 and acquires second determining data for the next reading line.

In the reading line $L_7$ indicated by the dot-dash line in FIG. 8, the diagonal line 35 for determining size disappears in the second determining data, or in other words, the diagonal-line-identifying unit 72 can not identify the diagonal line 35 for determining size. Therefore, YES is determined in step S12, and the document-size-determining unit 71 detects the document width Ws in the sub scanning direction based on the position of the reading line $L_7$ (step S14).

Next, the document-size-determining unit 71 moves to step S7, and determines whether or not there is a document size of the target sizes to be determined that matches the document width Ws in the sub scanning direction. In determination according the identified document width Ws in the sub scanning direction based on the second determining data, it is possible to identify the sizes A5 landscape, B5 landscape and A4 landscape.

In reading line $L_7$ indicated by the dot-dash line in FIG. 9, the width of the diagonal line 35 for determining size that is identified by the diagonal-line-identifying unit 72 is reduced (for example, the width of the diagonal line in the main scanning direction is reduced from 10 mm to 9 mm). Therefore, YES is determined in step S13, and the document-size-determining unit 71 detects the document width Wm in the main scanning direction based on the identified diagonal line 35 for determining size and the position of the reading line $L_7$ (step S15).

Next, the document-size-determining unit 71 moves to step S7 and determines whether or not there is a size among the target sizes to be determined that matches the document width Wm in the main scanning direction. In determination according to the identified document width Wm in the main scanning direction based on this second determining data, it is possible to determine the A5 portrait size. Incidentally, the A4 horizontal size and the A5 portrait size have the same document width Ws in the sub scanning direction, however, the A5 portrait size can be distinguished and identified by setting determination so that the document width Wm in the main scanning direction is determined without determining the document width Ws in the sub scanning direction.

In addition, in the present embodiment, the minimum target size to be determined is set as A5, however, the diagonal line 35 for determining size is used for determining small size, so it is also possible to determine a document size that is smaller than A5, such as a post card, name card and the like.

Moreover, the diagonal line 35 for determining size is provided in a range in which the sides of multiple document sizes that are determined by the small-size determining scan can be independently determined. Therefore, in this embodiment, as illustrated in FIG. 10, the diagonal line 35a for determining size may also be provided only in a range in which the sides of the sizes A4 landscape, B5 landscape, A5 portrait, and A5 landscape can be independently determined.

As explained above, according to the present embodiment, a copying machine 1 is provided with a document reading unit 2 in which a scanner 21 having multiple photoelectric conversion elements arranged in the main scanning direction moves in a sub scanning direction and scans a document that is placed on a contact glass 22 based on a reference vertex and acquires image data, and the copying machine 1 includes: a document platen cover (document-feeding unit 3) that opens and closes a document placement surface of the contact glass 22 and is provided with a fixed-width diagonal line 35 for determining size on a document-pressing surface that faces the contact glass 22; a first opening/closing detecting sensor 36 that detects the opening or closing of the document platen cover; a second opening/closing detecting sensor 26 that detects whether or not the document platen cover is opened further than a preset threshold angle as the opened or closed state at the threshold angle; a document-size-determining unit 71 that uses determining data that is read by the scanner 21 to determine the document size of a document that is placed on the contact glass 22 from among a plurality of target document sizes to be determined; and a diagonal-line-identifying unit 72 that identifies the diagonal line 35 for determining size in image data that is read by the scanner 21; wherein, the document-size-determining unit 71, when the second opening/closing detecting sensor 26 detects a closed state after detecting an opened state, executes a first determining operation for determining document size based on determining data that is read by arranging the scanner 21 at a large-size determining position L where it is possible to determine a document size by only a document width in the main scanning direction as a large-size determining scan, and; and when it is not possible to determine the document size by the first determining operation, after a closed state is detected by the first opening/closing detecting sensor 36, executes a second determining operation that causes the diagonal-line-identifying unit 72 to identify the diagonal line 35 for determining size in the determining data that is read while the scanner 21 scans from the large-size determining position L and determines a document size based on the change in the diagonal line 35 for determining size as a small-size determining scan.

With this configuration, by using both a the first determining operation by a large-size determining scan and a second determining operation by a small-size determining scan, it is possible to determine the document size even when there is a large number of target document sizes to be determined. Moreover, it is possible to quickly determine a large document size in the first determining operation by the large-size determining scan. In addition, the second determining operation by the small-size determining scan is executed after the document platen cover is closed and not while the document platen cover is being closed, so time restrictions are eliminated.

Furthermore, in this embodiment, the document-size-determining unit 71 causes the scanner 21 to be arranged at the large-size determining position L when an opened state is detected by the second opening/closing detecting sensor 26.

With this configuration, it is possible to quickly execute the first determining operation by the large-size determining scan.

Furthermore, in this embodiment, the document-size-determining unit 71, in the second determining operation by the small-size determining scan, causes the scanner 21 to read determining data while scanning in a direction from the large-size determining position L toward the reading starting reference line X.

With this configuration, it is possible to quickly start reading a document after determining the document size.

Moreover, in this embodiment, the size-determining unit 71, in the second determining operation by the small-size determining scan, detects both the document width Ws in the sub scanning direction at the disappearance of the diagonal line 35 for determining size, and the document width Wm in the main scanning direction at a decrease in the diagonal line width of the diagonal line 35 for determining size.

Furthermore, in this embodiment, the contact glass 22 has a size on which a document having a size up to A3 portrait size can be set, and the document-size-determining unit 71 determines document sizes that include the target document sizes to be determined A5 portrait, A5 landscape, B5 portrait, B5 landscape, A4 portrait, A4 landscape, B4 portrait and A3 portrait; where in the first determining operation by the large-size scan determines sizes B5 portrait, A4 portrait, B4 portrait and A3 portrait, and in the second determining operation by the small-size scan determines sizes A5 portrait, A5 landscape, B5 landscape and A4 landscape.

With this configuration, it is possible to efficiently determine a document size having a typical target size to be determined.

In addition, in this embodiment, the document-size-determining unit 71, in the second determining operation by the small-size determining scan, determines the sizes A5 landscape, B5 landscape and A4 landscape based on the detected document width Ws in the sub scanning direction, and determines the size A5 portrait based on the detected document width Wm in the main scanning direction.

With this configuration, it is possible to distinguish and determine the sizes A4 landscape and A5 portrait that have the same document width in the sub scanning direction.

In typical technology described above, only the three types of document sizes A3 and A4 portrait and landscape are determined using four patches, and determining document sizes that include B sizes and size A5 is difficult. In other words, the document size is determined by combining multiple patches, so as the number of document sizes as target sizes to be determined increases, it becomes difficult to handle the increase.

The technology according to the present disclosure has an advantage in that by using both the first determining operation and the second determining operation, it is possible to determine a document size even when there is a large number of target document sizes to be determined.

Incidentally, the technology according to the present disclosure is not limited by the embodiments described above, and it is clear that each of the embodiments can be suitably modified within the range of the technical idea of the present disclosure. Moreover, the number, position, shape and the like of the components described above are not limited to those described in the embodiments above, and the number, position, shape and the like can be suitably set for implementing the technology according to the present disclosure. In addition, in each of the drawings, the same reference numbers are given to components that are the same.

What is claimed is:
1. A document reading apparatus for scanning a document that is placed on a contact glass based on a reference vertex and reading image data while causing a scanner in which a plurality of photoelectric conversion elements are arranged in a main scanning direction to move in a sub scanning direction, comprising:
a document platen cover on which a diagonal line for determining size having a fixed width is provided on a document-pressing surface that faces the contact glass, and that opens and closes a document placement surface of the contact glass;
a first opening/closing detecting unit for detecting the opening or closing of the document platen cover;
a second opening/closing detecting unit for detecting whether or not the document platen cover is opened more than a preset threshold angle as an opened state or closed state at the threshold angle;
a document-size-determining unit for determining a document size of a document that is placed on the contact glass from among multiple target document sizes to be determined by using determining data that is read by the scanner; and
a diagonal-line-identifying unit for identifying the diagonal line for determining size in image data that is read by the scanner; wherein
the document-size-determining unit, when the second opening/closing detecting unit detects a closed state after detecting an opened state, executes a first determining operation for determining a document size based on the determining data that is read by arranging the scanner at a size-determining position where it is possible to determine a document size by only the document width in the main scanning direction;
when a document size cannot be determined by the first determining operation, the document-size-determining unit, after the first opening/closing detecting unit detects a closed state, executes a second determining operation that causes the diagonal-line-identifying unit to identify the diagonal line for determining size in the determining data that is read while the scanner scans from the size-determining position, and determines a document size based on a change in the diagonal line for determining size, and
the diagonal line is oriented on the document-pressing surface such that, when the document platen cover is closed and the document-pressing surface faces the contact glass, the diagonal line is aligned with the diagonal of the maximum area that can be scanned by the scanner.

2. The document reading apparatus according to claim 1, wherein
the document-size-determining unit, when the second opening/closing detecting unit detects an opened state by the document platen cover, arranges the scanner at the size-determining position.

3. The document reading apparatus according to claim 1, wherein
the document-size determining unit, in the second determining operation, causes the scanner to read the determining data while scanning in a direction from the size-determining position toward a reading starting position.

4. The document reading apparatus according to claim 1, wherein
the document-size determining unit, in the second determining operation, detects both the document width in the sub scanning direction at a disappearance of the diagonal line for determining size, and the document width in the main scanning direction at a decrease in diagonal line width of the diagonal line for determining size.

5. The document reading apparatus according to claim 1, wherein
the contact glass has a size on which a document up to a size A3 portrait can be set; and
of target document sizes to be determined that include the sizes A5 portrait, A5 landscape, B5 portrait, B5 landscape, A4 portrait, A4 landscape, B4 portrait, and A3 portrait, the document-size determining unit determines document sizes B5 portrait, A4 portrait, B4 portrait and A3 portrait in the first-determining operation, and determines document sizes A5 portrait, A5 landscape, B5 landscape and A4 landscape in the second determining operation.

6. The document reading apparatus according to claim 1, wherein
the document-size determining unit, in the second determining operation, determines document sizes A5 landscape, B5 landscape and A4 landscape based on the detected document width in the sub scanning direction, and determines document size A5 portrait based on the detected document width in the main scanning direction.

7. The document reading apparatus according to claim 1, wherein the diagonal line has a color density that is higher than the color density of the document-pressing surface.

8. The document reading apparatus according to claim 1, wherein said fixed width is a fixed width in the main scanning direction.

9. The document reading apparatus according to claim 8, wherein the change in the diagonal line is a change in the detected width of the diagonal line in the main scanning direction due to the document blocking part of the diagonal line.

10. The document reading apparatus according to claim 1, wherein the change in the diagonal line is a change in the detected width of the diagonal line due to the document blocking part of the diagonal line.

* * * * *